United States Patent [19]

Graham, III et al.

[11] Patent Number: 4,994,288

[45] Date of Patent: Feb. 19, 1991

[54] METHOD FOR MAKING A COMPOSITE CHEESE PRODUCT

[75] Inventors: Robert C. Graham, III; Ziba F. Graham, Jr., both of Washington, Ind.

[73] Assignee: Graham Cheese Corporation, Elnora, Ind.

[21] Appl. No.: 381,535

[22] Filed: Jul. 18, 1989

[51] Int. Cl.⁵ .............................................. A23C 19/00
[52] U.S. Cl. .................................... 426/249; 426/389; 426/469; 426/475; 426/479; 426/582
[58] Field of Search ............... 426/389, 249, 582, 469, 426/475, 479

[56] References Cited

U.S. PATENT DOCUMENTS

| | | | |
|---|---|---|---|
| 545,294 | 8/1895 | Hunter | 426/249 |
| 1,429,405 | 9/1922 | Carter et al. | 426/249 |
| 1,429,409 | 9/1922 | Carter et al. | 426/249 |
| 1,855,145 | 4/1932 | Jones | 426/87 |
| 2,053,238 | 9/1936 | Dulany | 426/104 |
| 2,874,649 | 2/1959 | Pelletier | 426/249 |
| 2,937,095 | 5/1960 | Zitin | 426/92 |
| 3,060,494 | 6/1961 | Noble | 426/513 |
| 3,582,353 | 6/1971 | Fehr, Jr. et al. | 426/94 |
| 4,225,627 | 9/1980 | Moore | 426/389 |

Primary Examiner—Donald E. Czaja
Assistant Examiner—Helen Pratt
Attorney, Agent, or Firm—Woodard, Emhardt, Naughton Moriarty & McNett

[57] ABSTRACT

A composite cheese product having a first colored outer form and an inner plug having a desired decorative shape of a second, variegated color extending continuously through the outer form. The composite cheese product is manufactured by cutting first and second cheese products of variegated colors to a desired thickness so as to create preforms having the exterior contour of the outer form. A plug cutter having the shape of the inner plug is inserted into the preforms and plugs are withdrawn from the preforms with the plug cutter. The plugs are then removed from the plug cutter, interchanged and reinserted into the preforms of variegated color.

4 Claims, 3 Drawing Sheets

METHOD FOR MAKING A COMPOSITE CHEESE PRODUCT

BACKGROUND OF THE INVENTION

Field of the Invention

The present invention relates generally to the decorative shaping of food products and, more particularly, to a composite cheese product having an inner decorative form, variegated in color from the outer form of the product, which extends continuously through the product so that slices cut from the product will each bear the inner decorative form.

Heretofore, it has been known to form various types of decorative cheese products to enhance the aesthetic appeal of the product. For example, it is well known to mix cheese products of variegated colors to achieve a calico type appearance.

In addition, it is known to stamp or print a design on the surface of a cheese product. Although initially pleasing in appearance, once sliced, the cheese product does not bear the decorative design in successive slices.

Natural cheese comes from manufacturers in various standard sizes and shapes. As an example, a cylinder of cheese having a 6 inch diameter, 13 inches long and weighing approximately 13 lbs. is commonly referred to in the industry as a "longhorn" of cheese. While a cheese product may be custom formed so as to have a shape which when sliced exhibits the desired decorative shape in each slice, it has not heretofore been possible to custom shape the cheese product from a standard shape such as a "longhorn" without incurring substantial costs, labor and wastage of cheese.

The following patents disclose various methods for forming designs in food products:

U. S. Pat. No. 545,294 to Hunter discloses a method and apparatus for forming colored designs extending continuously from end to end through blocks of ice cream. The method requires successively adding variegated layers of ice cream within a mold and scraping each layer with a suitably contoured template. The method is laborious and results in a substantial amount of unused excess food product.

U.S. Pat. No. 1,429,409 to Carter et al. disclose further method for manufacturing ice cream bricks having variegated designs extending from end to end therethrough. The method disclosed therein involves the use of a punch or die having a cavity within which a core having the decorative contour is removed from the brick. The method discloses the use of a centering template, which may be placed directly on the surface of the brick, for centering and guiding the path of the punch. No mechanism is, however, disclosed for removing the core from the punch with its decorative shape intact. Rather, the cavity within the brick is apparently filled with a food product filler which is in a plasticized state and then subjected to further low temperatures to freeze the final product.

U.S. Pat. No. 3,060,494 to Noble discloses a T-bone food mold which includes an outer mold element configured to the exterior shape of a T-bone steak, and a bone material mold that is adapted to pivot at the top of the outer mold element, as shown in FIG. 1 thereof. A supplemental T-bone form is placed within the main outer mold element while a steak simulating material is packed around the supplemental mold within the exterior mold. The mold is also filled with a bone colored material that can be different in appearance from the steak colored material. The entire mold is placed on a grill or hot plate and cooked, after which the supplemental T-bone form is removed and the main T-bone mold is pivoted into position within the outside mold element to produce the simulated T-bone steak.

U.S. Pat. No. 2,937,095 to Zitin discloses a cylindrical casing that is packed with meat around a centrally located stud that is shaped in a particular form, such as a star. Once the meat is formed and cooked within the casing, the stud is removed to leave a cavity in the shape of the stud. The central cavity is then filled with molten cheese which is allowed to cure to produce a composite food product having an exterior meat casing and an interior cheese core. As with the subject invention, each layer that is sliced from the composite food product includes the desired central shape throughout.

U.S. Pat. No. 2,874,649 to Pelletier discloses a process for producing candy having an inset design extending along its length. The candy core is molded to have an enlargement of the desired inset design and surrounded with a candy matrix which is conformed to a cylindrical form. The cylindrical composite is then elongated by rolling in alternate directions to reduce the design cross section to the desired size.

U.S. Pat. No. 2,053,238 to Dulany, discloses cutting of a solid or cored cylinder of pineapple into a star shape which may be sliced transversely to bear the star shape in each slice.

U.S. Pat. No. 1,855,145 to Jones discloses an article of food adapted to be eaten endwise which comprises a plurality of component sections of different materials arranged lengthwise such that the proportion of one material varies progressively along the length.

U.S. Pat. No 3,582,353 to Fehr, Jr. et al.discloses a method of preparing a food product with localized areas of coloring or flavoring by mixing dough ingredients with particles of hard shortening material having flavoring or coloring material incorporated therein.

SUMMARY OF THE INVENTION

One embodiment of the present invention is characterized by a method for making a composite cheese product having a first colored outer form and an inner plug having a desired decorative shape of a second, variegated color extending continuously through the outer form. The composite cheese product is manufactured by cutting first and second cheese products of variegated colors to a desired thickness so as to create preforms having the exterior contour of the outer form. A plug cutter having the shape of the inner plug is inserted into the preforms and the plugs are withdrawn from the preforms with the plug cutter. The plugs are then removed from the plug cutter, interchanged and reinserted into the preforms of variegated color. In another aspect, the present invention is characterized by a composite cheese produced by the method above described.

Yet further, the present invention is characterized by a device for making a composite cheese product having inner and outer forms of variegated color. The device may be characterized as including a plug cutter having an end wall and one or more axially extending side walls defining a plug cavity. The one or more side walls further define an edge surface opposite the end wall for cutting a plug from the cheese product, the one or more side walls being contoured to have a desired decorative shape. The device is further characterized by a fluid coupling connected to the plug cutter in fluid communication with the plug cavity through the end wall and a pusher plate slidably disposed within the plug cavity.

Accordingly, it is an object of the present invention to provide an improved device and method for making a composite cheese product having an inner, decoratively shaped plug which extends continuously through the product.

Related objects and advantages of the present invention will become more apparent by reference to the following figures and detailed description.

DESCRIPTION OF THE PREFERRED EMBODIMENT

Figure 1:
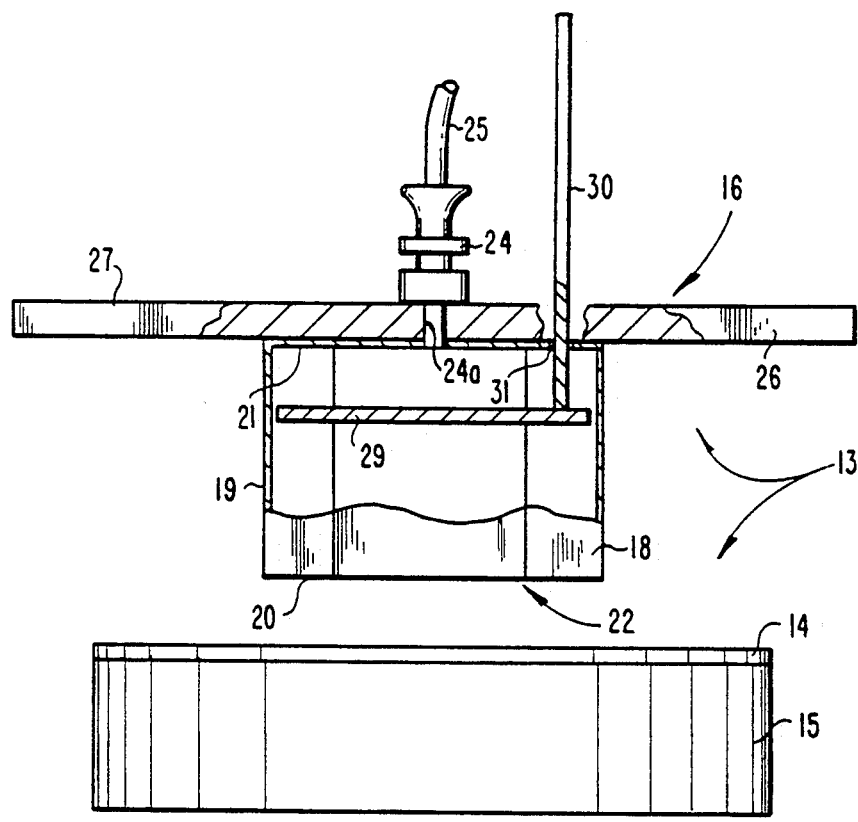
FIG. 1 is an elevation view partially in section, showing a preferred embodiment of the airtractor, pusher plate and template of the present invention aligned in position to cut a plug from a longhorn of cheese.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 5:
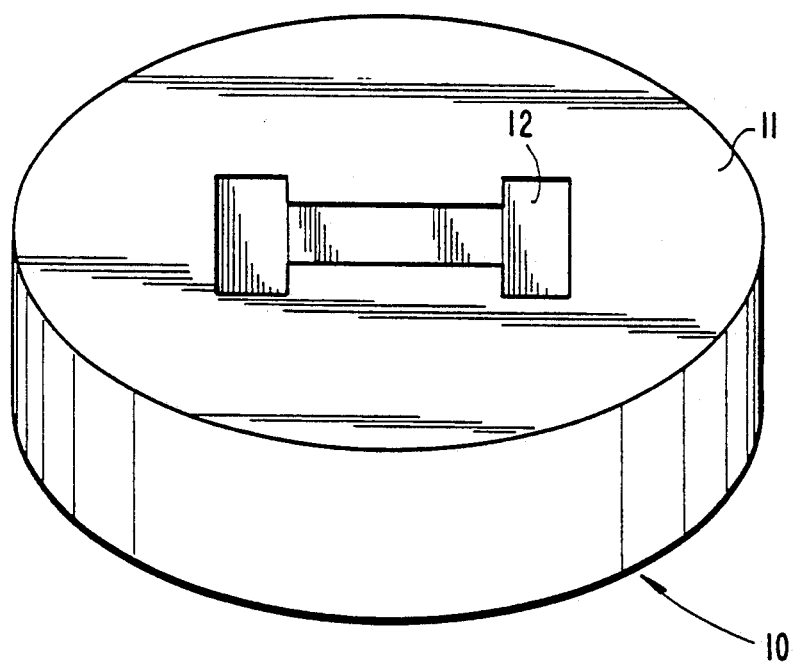
FIG. 5 is a perspective view showing the composite cheese product produced by performing the method of the present invention using the airtractor, pusher plate and template shown in FIG. 1.

Referring now to the drawings in detail, there is shown generally designated at 10 in FIG. 5 an example of a composite cheese product which may be produced employing the method of the present invention. The product 10 has the shape of a truncated cylinder and includes an outer form 11 made from a cheese product having a first color, such as for example white, and an inner plug 12 made from a cheese product having a variegated color, such as orange. The plug 12 has a decorative design, here shown in the shape of an "I", which extends continuously through the composite cheese product 10 such that horizontal slices of the product will each bear the "I" design.

The composite cheese product 10 is made by employing a device 13 having three major components, those being a template 14, a plug cutter assembly 16 and pusher plate 29.

Figure 2:
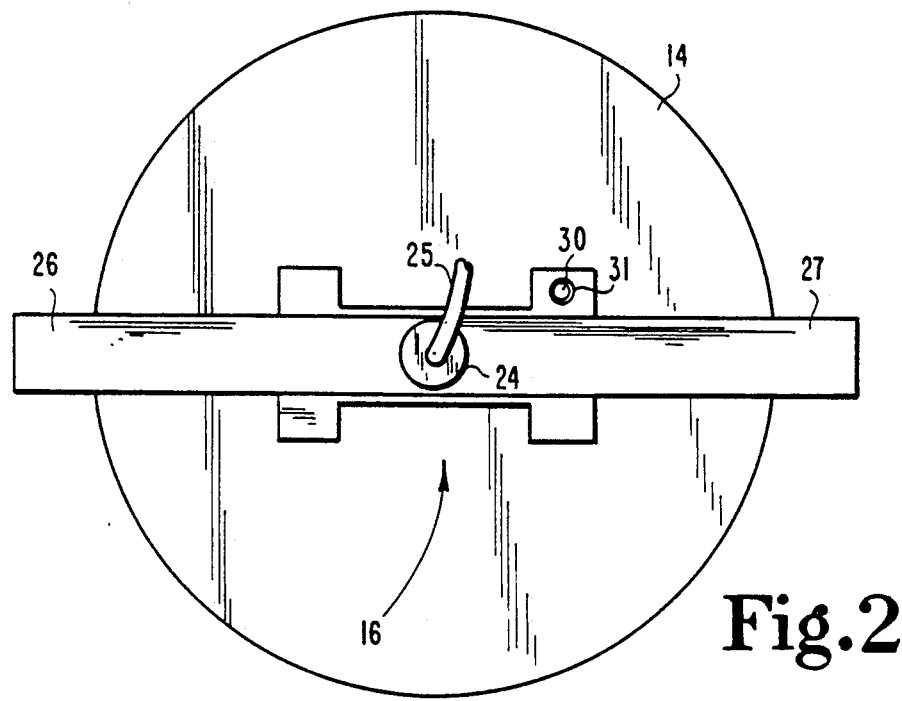
FIG. 2 is a top view of FIG. 1.
Figure 3:
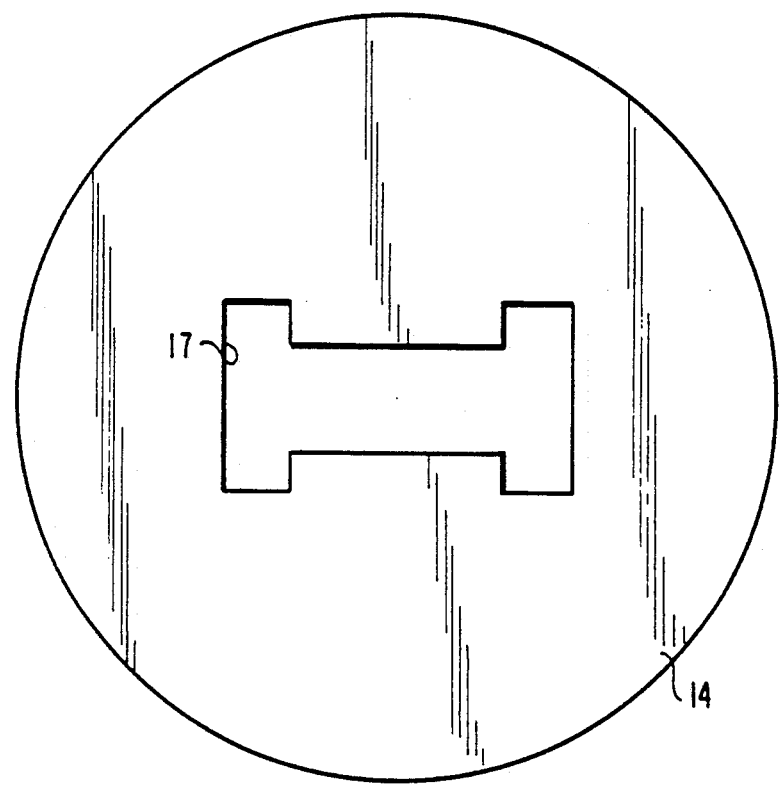
FIG. 3 is a top view of the template of FIG. 1.

Referring particularly to FIGS. 2 and 3, the template 14 has an opening 17 therethrough in the shape of the desired plug design and which is sized to closely receive therethrough the cutting portion of plug cutter assembly 16. The outer margins of the template 14 is preferably sized and shaped to correspond to the outer margins of the longhorn slice 15 to facilitate its alignment therewith. The template serves the twofold purpose of centering the plug cutter assembly 16 relative to the cheese slice 15 and to provide a suitable surface to bear or press down upon as the plug cutter assembly is withdrawn from the cheese slice to facilitate withdrawal and prevent the cheese slice from fragmenting.

Referring to FIGS. 1 and 2, the plug cutter assembly 16 includes a cutting portion 18 having one or more enclosed, axially extending side walls 19 which together define a cutting edge 20. An end wall 21 is integrally formed with the side walls 19 at the end opposite cutting edge 20. Side walls 19 and end wall 21 together define a plug cavity 22, with the side walls 19 being contoured to give the cavity 22 the desired "I" shape. A fluid coupling 24 is mounted to end wall 21 of plug cutter assembly 16 in fluid communication through passage 24a with the plug cavity and communicates air under pressure from a suitable external source of compressed air (not shown) through line 25 for a purpose which will be fully described later herein. A pair of integrally formed handles 26 and 27 are fixedly attached to end wall 21 of cutting portion 18 in a position oppositely disposed about coupling 24.

Figure 4:
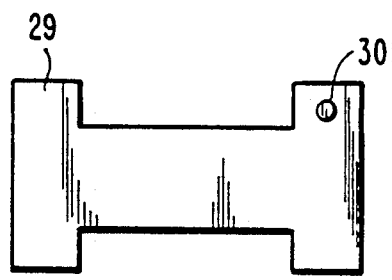
FIG. 4 is a top view of the pusher plate of FIG. 1.

Referring to FIGS. 1 and 4, pusher plate 29 is slidably disposed within plug cavity 22. Pusher plate 29 is shaped to correspond in a close sliding fit to the contour of the side walls 19 defining cavity 22. A rod 30 is fixedly attached to the back side of pusher plate 29 facing end wall 21 and slidably extends through a hole 31 in end wall 21. The purpose of the pusher plate 29 is to facilitate an even distribution of the force applied from the compressed air source into cavity 22 to push a plug of cheese out of the cavity 22. The rod 30 allows the operator to hold the pusher plate 29 in position within cavity 22 as the plug cutter assembly 16 is positioned over the template 14 for a purpose which will be hereinafter described.

A preferred method of producing the composite cheese product of the present invention will now be described. The illustrative composite cheese product 10 shown in FIG. 5 is produced from two standard sized longhorns of cheese, one colored orange and the other colored white. Both longhorns are first warmed to a temperature of about 65–70° F. Next, each longhorn is cut into slices of equal thickness, usually from 1–2 inches thick, employing a standard type cheese cutting machine well known to those in the art (not shown). Template 14 is then aligned over one of the cheese slices, designated reference numeral 15 in FIG. 1, to center the positioning and guide the advancement of plug cutter assembly 16.

Referring to FIG. 1, with pusher plate 29 positioned inside cavity 22, the handle 26 is grasped with one hand and rod 30 with the other hand and the cutting edge 20 of plug cutter assembly 16 is positioned into the opening in template 14. Next, grasping both handles 26 and 27, the operator advances the cutting edge of plug cutter assembly 16 through the cheese slice 15. The operator removes plug 12 (FIG. 5) from the cheese slice 15 by lifting one of the handles with one hand and using the other hand to hold the template 14 down firmly against the cheese slice 15. Once the plug cutter assembly 16 is removed from cheese slice 15, plug 12 is removed intact from cavity 22 by applying compressed air through line 25 into cavity 22. As this occurs, pusher plate 29 urges the cheese plug from cavity 22. In practice, it has been found that compressed air at about 15–20 p.s.i. is sufficient to ease the plug out of cavity 22 without breakage.

Upon removing plug 12 from cavity 22, the template 14, plug cutter assembly 16 and pusher plate 29 are cleaned and the steps previously described are repeated using a second cheese slice of variegated color. The orange and white plugs are then interchanged, with the orange plug 12 inserted in the white outer form 11, and vice versa. The result is two complimentary colored composite cheese products 10 manufactured by a method which produces no wastage of cheese product.

It is to be understood that the colors and shape of the composite cheese product 10 can be varied as desired from that shown in FIG. 5 based upon personal preference and market demands, without departing from the scope of the invention. As an example, it is perceived that letters and colors associated with various colleges and universities may be particularly appealing, as well as other widely recognized designs, symbols, logos, and trademarks.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for making a composite cheese product having an outer form having a first color and an inner plug extending continuously through the outer form defined by a cheese product having a second, variegated color, comprising the steps of:

(1) cutting a first colored cheese product to a desired thickness so as to create a preform having the exterior contour of said outer form;
    (2) inserting a plug cutter having the shape of said inner plug into said preform;
    (3) withdrawing said plug cutter along with a correspondingly shaped plug from said preform disposed therein;
    (4) removing said plug from said plug cutter;
    (5) repeating steps (1) through (4) on a second colored cheese product, thereby creating a second, similarly shaped outer form and plug of variegated color; and
    (6) interchanging said plugs and reinserting the interchanged plugs into said preforms of variegated color.

2. The method of claim 1 wherein removing step (4) of the process of manufacturing said product is accomplished by introducing compressed air into said plug cutter.

3. The method of claim 2 wherein said plug cutter is provided with a pusher plate and said removing step (4) is accomplished by introducing compressed air into said plug cutter behind said pusher plate.

4. The method of claim 1 wherein said process for manufacturing said product is further accomplished by positioning a template over said perform and said withdrawing step (3) is accomplished while holding said template down against said preform.

* * * * *